United States Patent

[11] 3,587,079

| [72] | Inventors | Ronald F. Obergefell<br>Cleveland;<br>Robert R. Roberts, Streetsboro, both of, Ohio |
|---|---|---|
| [21] | Appl. No. | 757,401 |
| [22] | Filed | Sept. 4, 1968 |
| [45] | Patented | June 22, 1971 |
| [73] | Assignee | Houdaile Industries, Inc.<br>Cleveland, Ohio |

[54] MIST SENSOR
4 Claims, 3 Drawing Figs.

[52] U.S. Cl. .................................................. 340/270,
250/218
[51] Int. Cl. ..................................................... G08b 21/00
[50] Field of Search ........................................... 340/235,
236, 237, 270; 250/218

[56] References Cited
UNITED STATES PATENTS

| 2,935,909 | 5/1960 | Mathisen ...................... | 250/218 UX |
| 3,268,734 | 8/1966 | Bjorn ............................ | 250/218 |
| 3,417,250 | 12/1968 | Kadivnik ...................... | 250/218 |
| 3,469,250 | 9/1969 | Voigt ............................ | 340/237 |

*Primary Examiner*—Robert L. Richardson
*Attorney*—Hill, Sherman, Meroni, Gross & Simpson ABSTRACT: A mist sensor for sensing mist such as oil mist used for lubricating purposes so as to give a warning if the oil mist falls below a predetermined density so that the machine being lubricated may be stopped before being damaged. A test circuit and indicator is provided for assuring that the warning light is operative so that the indicator will not fail to operate due to a faulty indicator circuit.

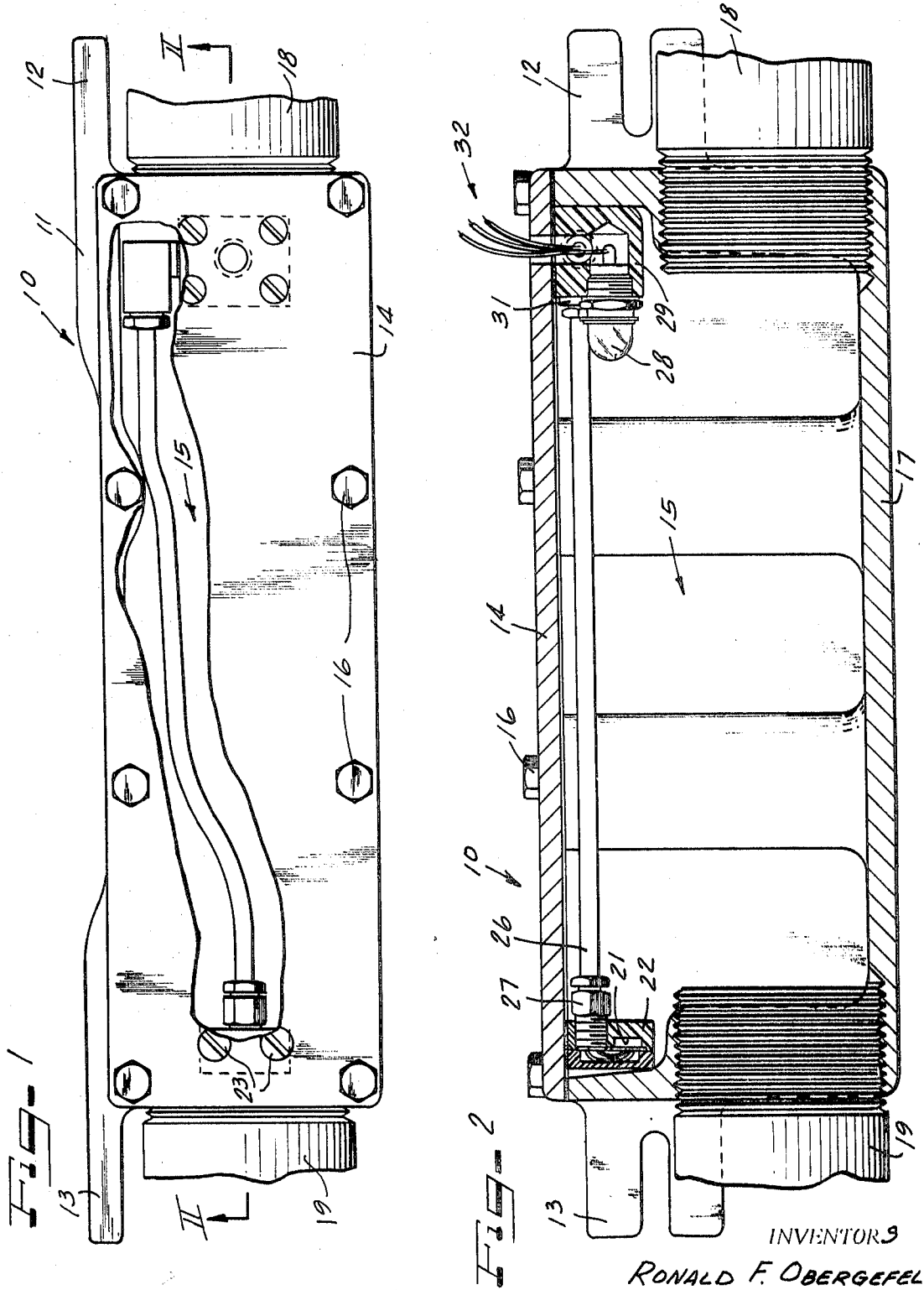

INVENTORS
RONALD F. OBERGEFELL
ROBERT D. ROBERTS 3,587,079

MIST SENSOR

BACKGROUND OF THE INVENTION

1. Field of the Invention

This invention relates in general to lubricating means and in particular to an oil-mist sensor which detects the density of oil mist or other mist and which is a warning indicator when the density of the mist falls below a predetermined level.

2. Description of the Prior Art

Prior art systems have used oil-mist lubrications which mix high velocity air and oil to generate a fine spray. The fine spray is provided by suitable conduit means to parts, such as bearings, that are to be lubricated.

SUMMARY OF THE INVENTION

The present invention relates to a sensing device which indicates when the density of oil or other mist falls below a predetermined level. When this occurs, a photoelectric cell energizes a warning circuit which indicates that a danger condition exists. So as to assure that the warning indicator is operative, a bulb filament detection circuit is provided which monitors the condition of the warning bulb has opened. Thus, the circuit provides an oil-mist monitoring device and a circuit for assuring that the warning device is operative.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a top view which has been partially cut away to show the oil-mist sensor of this invention;

FIG. 2 is a sectional view taken on line II–II of FIG. 1; and

DESCRIPTION OF THE PREFERRED EMBODIMENTS

Figure 3:
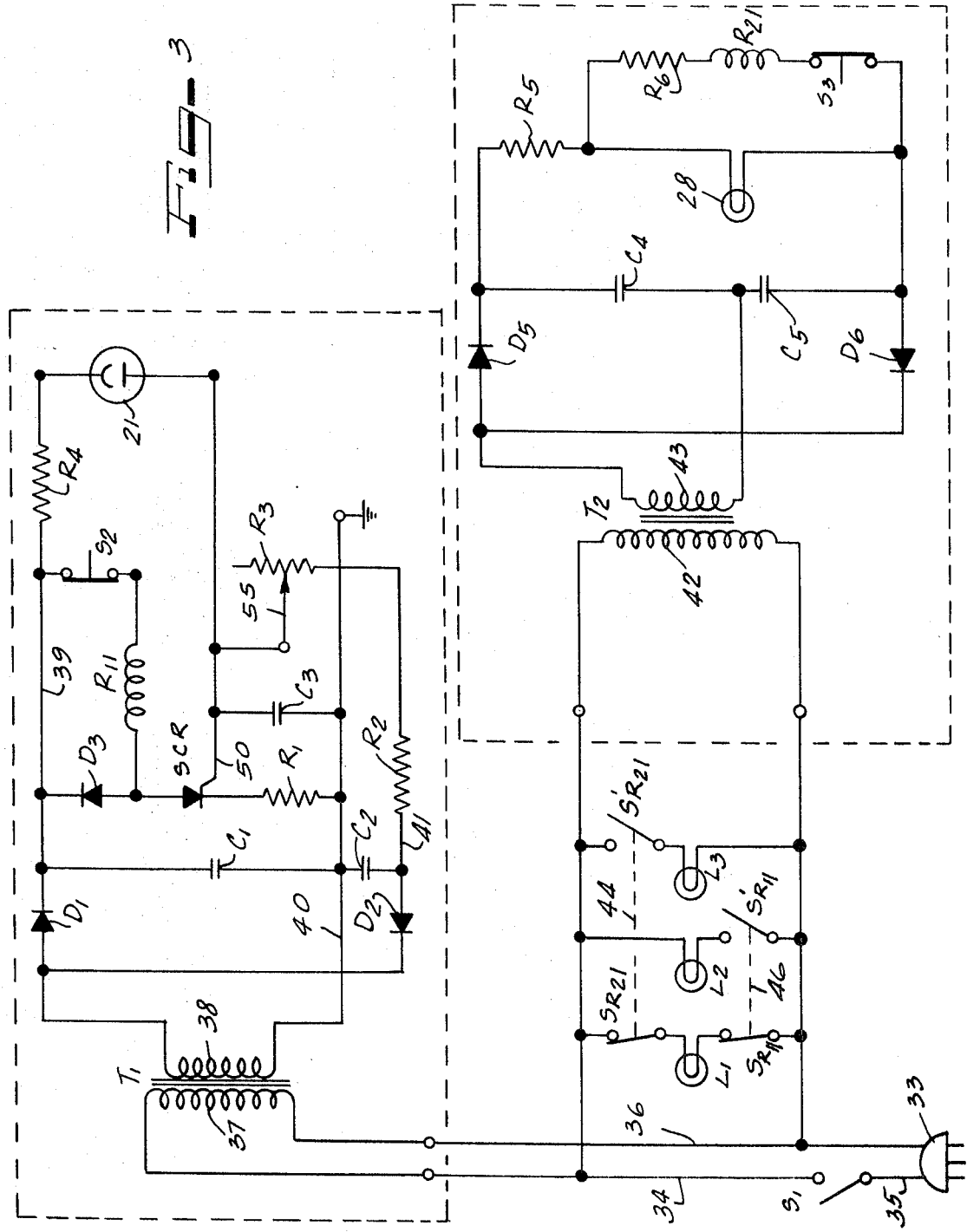
FIG. 3 is a schematic view of the oil-mist sensor according to this invention.

FIGS. 1 and 2 illustrate the oil-mist sensor of this invention. The sensor 10 is mounted in a conduit which has an input 18 that is connected to one end of the sensor 10 and an output conduit 19 which is connected to the other end of the sensor 10. A sideplate 11 of the sensor 10 is formed with brackets 12 and 13 for mounting the sensor on a suitable support means, (not shown). The sensor 10 has a hollow chamber through which the oil mist passes and is formed with a top wall 14 and a bottom wall 17. A photoelectric cell 21 is mounted in one end of the sensor above the conduit 19 and has a transluscent protective cover 22. The photocell is mounted by suitable mounting bolts 23, as shown in FIG. 1. A protective conduit 26 is connected by a coupling 27 to the photocell support and has its other end connected by a coupling 31 to a light support 29 in which a light bulb 28 is mounted. Suitable electrical conductors 32 are connected to the light bulb and photocell 21.

FIG. 3 is the electrical schematic for the mist sensor and bulb failure detection circuit. A power plug 33 has a grounded plug and two power leads 36 and 35. An on-off switch $S_1$ is connected in lead 35 and connects lead 35 to lead 34 when the switch $S_1$ is closed. The primary 37 of a transformer $T_1$ is connected across the leads 34 and 36. The secondary 38 of the transformer $T_1$ has one side connected to a diode $D_1$ which is poled in a first direction, and to a second diode $D_2$ which is poled in the opposite direction. The other side of the secondary 38 is connected to ground. A first capacitor $C_1$ to ground, and a second capacitor $C_2$ is connected from the other side of the diode $D_2$ to ground. A diode $D_3$ has one side connected to lead 39 and the other side connected to an SCR which has its other side connected to a resistor $R_1$ which has its other side grounded. The gate 50 of the SCR is connected to a capacitor $C_3$ which has its opposite side grounded and to the wiper contact 55 of a potentiometer $R_3$. One end of the potentiometer $R_3$ is connected to a resistor $R_2$ which has its other side connected to the junction point between the diode $D_2$ and the capacitor $C_2$. A reset switch $S_2$ and relay $R_{11}$ are connected in series across the diode $D_3$. A resistor $R_4$ and the photocell 21 are connected in series between the diode $D_1$ and the gate 50 of the SCR.

A normal operating light $L_1$ is connected across the leads 34 and 36 in series with switches $SR_{21}$ and $SR_{11}$ which are normally closed when the oil mist is above a predetermined density and the bulb 28 is operating. A low density warning light $L_2$ is connected from the lead 34 to a normally open switch $SR_{11'}$ which has its other side connected to the lead 36. A linkage 46 connects the switches $SR_{11}$ and $SR_{11'}$. Switches $SR_{11}$ and $SR_{11'}$ are operated by the relay $R_{11}$. A bulb-failure warning light $L_3$ has one side connected to the lead 36 and the other side connected to a normally open switch $SR_{21'}$ which has its other side connected to the lead 34. The switches $SR_{21}$ and $SR_{21'}$ are connected by link 44 and are controlled by the relay $R_{21}$.

The primary 42 of a transformer $T_2$ is connected to the leads 34 and 36. A secondary 43 of the transformer $T_2$ has a first side which is connected to oppositely poled diodes $D_5$ and $D_6$, and condensers $C_4$ and $C_5$ are connected across the other sides of the diode $D_5$ and $D_6$. The junction point between the capacitors $C_4$ and $C_5$ is connected to the other end of the secondary 43. A resistor $R_5$ is connected from the diode $D_5$ to the light 28 which has its other side connected to the diode $D_6$. A resistor $R_6$ and a relay $R_{21}$ and reset switch $S_3$ are connected in series across the light 28.

The power supplied to the plug 33 is normally 115 volts, 60 cycle and the transformer $T_1$ converts the AC to 20 volts AC. The diodes $D_1$ and $D_2$ convert the AC to DC and the capacitors $C_1$ and $C_2$ filter the power supply.

The photocell 21 and potentiometer comprising the resistor $R_3$ and contact 55 from a voltage dividing circuit with one side of the photocell connected to the positive side of the power supply through the resistor $R_4$ and one side of the potentiometer connected to the negative side of the power supply through the resistor $R_2$. The junction points of the potentiometer and photocell are connected to the gate 50 of the silicon controlled rectifier, SCR. The silicon controlled rectifier requires a +0.8 volts to trigger it into a conducting state, and when the silicon controlled rectifier conducts, it energizes the relay $R_{11}$. If the resistance of the photocell drops due to a high light intensity being received from the bulb 28, which indicates that the oil-mist density is low, the gate 50 will reach 0.8 volts and the SCR will be turned on.

The gating level of the SCR will depend upon the setting of the contact 55 of the potentiometer $R_3$. The lower the resistance set across the potentiometer, the more negative the gate of the SCR becomes, and since the SCR will not trigger on negative voltage, the photocell must then drop even lower in resistance to make the gate positive. Thus, the adjustment of the potentiometer contact 55 determines how low the resistance of the photocell must be before triggering occurs. The contact 55 therefore adjusts the light level setting (and thus the density) at which triggering of the SCR occurs.

The transformer $T_2$ converts the 115 volt, 60 cycle to 20 volt AC which is rectified and filtered by the diodes $D_5$, $D_6$ and capacitors $C_4$ and $C_5$. The light 28 and resistor $R_5$ are connected in series across the rectified power supply and the light 28 will glow if the bulb filament is good. The filament of the bulb 28 is in parallel with the resistor $R_6$ and relay $R_{21}$ and the relay will remain unenergized as long as the filament in the bulb 28 is intact. If the filament in the bulb 28 opens, the current through the relay $R_{21}$ will become large enough to cause it to pull in and move the linkage 44 closing the switch $SR_{21}$ and opening switch $SR_{21'}$. The reset buttons $S_2$ and $S_3$ allow the circuits to be reset.

Thus, in operation, with a suitable density of oil mist passing through the sensor 10, the resistance across the photocell 21 will be sufficiently high to prevent the SCR from being gated on. Under these conditions, the relay $R_{11}$ will be unenergized and the switches $SR_{11}$ and $SR_{11'}$ will be in the position shown in FIG. 3. If the filament of the light 28 is good, the relay $R_{21}$ will be unenergized and the switches $SR_{21}$ and $SR_{21'}$ will be in the position shown in FIG. 3. If the density of the oil mist decreases to a point where the light received by the photocell 21 from the light 28 is sufficient to reduce its resistance to the gating point of the SCR, relay $R_{11}$ will be energized and switch $SR_{11}$ will open turning off the normal operation light $L_1$ and switch $SR_{11'}$ will close turning on the low mist density warning light $L_2$. The operator will note the warning light and will correct the condition to increase the oil density or take other necessary action.

In the event that the filament in the light 28 fails, the relay $R_{21}$ will be energized, thus opening the switch contact $SR_{21}$ and closing switch contact $SR_{21'}$. This will turn off the normal operation light $L_1$ and turn on the bulb-failure warning light $L_3$. The operator will then replace the light bulb 28 and push the reset button $S_3$.

Although minor modifications might be suggested by those versed in the art, it should be understood that we wish to embody within the scope of the patent warranted hereon all such modifications as reasonably and properly come within the scope of our contribution to the art.

We claim:

1. Apparatus for detecting the density of a fluid comprising:
   a chamber through which said fluid passes,
   a light source having a filament for supplying light in said chamber,
   a light detector mounted to receive light from said light source,
   a power supply,
   a first relay,
   a silicon controlled rectifier connected in series with said first relay across said power supply,
   the light detector connected to one side of the power supply and to the gate of the silicon controlled rectifier,
   a second relay connected in parallel with the filament of said light source and energized when said filament is open,
   three indicators,
   a first pair of switches in series with a first of said indicators across said power supply,
   a third switch connected in series with a second of said indicators across said power supply,
   a fourth switch connected in series with a third of said indicators across said power supply,
   said first relay connected to control the first one of said pair of switches and the third switch such that when one is open the other is closed, and
   said second relay connected to control the second one of said pair of switches and the fourth switch such that when one is open the other is closed.

2. Apparatus according to claim 1 comprising a potentiometer connected in circuit with the light detector and the gate to adjust the gating level of the silicon controlled rectifier.

3. Apparatus according to claim 1 comprising a second impedance in circuit with said second relay.

4. Apparatus for detecting the density of a fluid according to claim 1 wherein
   said first pair of switches are closed when the density of fluid in the chamber is sufficient and the first indicator is activated,
   wherein said third switch is closed and the first one of said pair of switches is open and the second indicator is activated when the density of fluid in said chamber is below a desired level,
   and wherein said fourth switch is closed and the second of said pair of switches is open and the third indicator is activated when the filament is open.

UNITED STATES PATENT OFFICE
CERTIFICATE OF CORRECTION

Patent No. 3,587,079      Dated June 22, 1971

Inventor(s) RONALD F. OBERGEFELL and ROBERT D. ROBERTS

It is certified that error appears in the above-identified patent and that said Letters Patent are hereby corrected as shown below:

Title Page [73] Assignee: "Houdaile" should read --Houdaille--.

Title Page [72] Inventors: "Robert R. Roberts" should read --Robert D. Roberts--.

Column 1, line 25, after "bulb" insert --and indicates when the filament of the warning bulb--;

line 68, after "$C_1$" insert --is connected from the other side of the diode $D_1$--.

Column 2, line 68, "$SR_{21}$" should read --$SR_{21}'$--.

Signed and sealed this 28th day of March 1972.

(SEAL)
Attest:

EDWARD M. FLETCHER, JR.
Attesting Officer

ROBERT GOTTSCHALK
Commissioner of Patents